J. H. PRESS.
VEHICLE BODY.
APPLICATION FILED SEPT. 11, 1917.

1,321,331.

Patented Nov. 11, 1919.
2 SHEETS—SHEET 1.

Witnesses:
Robert Weir
Arthur W. Carlson

Inventor
Jacob H. Press
by Hice & Hice Attys

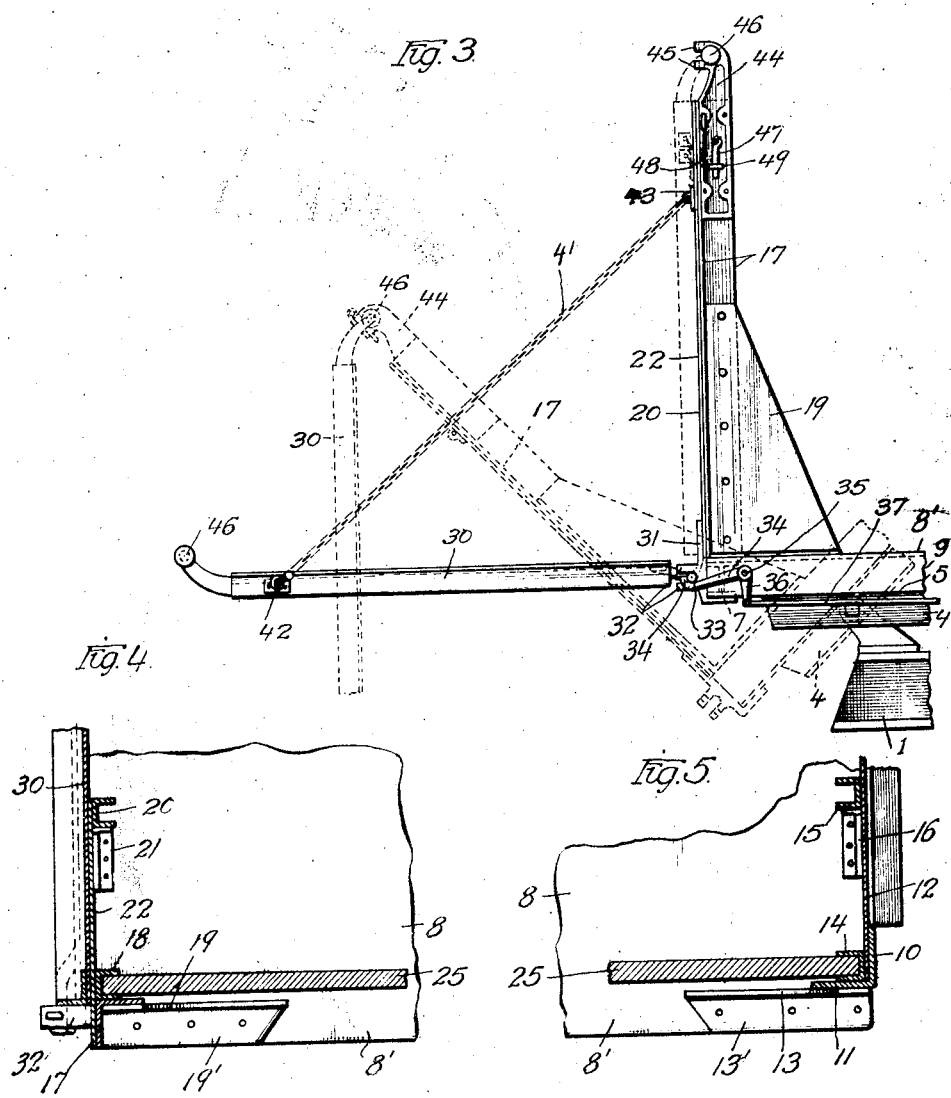

UNITED STATES PATENT OFFICE.

JACOB H. PRESS, OF CHICAGO, ILLINOIS.

VEHICLE-BODY.

1,321,331.  Specification of Letters Patent.  Patented Nov. 11, 1919.

Application filed September 11, 1917. Serial No. 190,725.

*To all whom it may concern:*

Be it known that I, JACOB H. PRESS, a citizen of the United States, residing at Chicago, in the county of Cook and State of Illinois, have invented certain new and useful Improvements in Vehicle-Bodies, of which the following is a description.

My invention belongs to that general class of devices known as truck, wagon or vehicle bodies, and relates particularly to a truck body especially adapted to the carrying of brick and other building material, but, however, it is not limited in its use to said service. The invention has among its objects the production of a device of the kind described that is simple, convenient, durable, efficient, satisfactory, and of comparatively large capacity. In the embodiment of the invention shown the same is employed on a motor truck, the body being also tiltable upon the truck, so that the load may be dumped when desired. The invention has among its further objects the production of a convenient body that is adapted to securely carry large loads, where the material is of some bulk and less weight, as well as material of less bulk and greater weight. This feature is particularly desirable in a truck used for commercial purposes, which may be called upon to haul various materials or merchandise.

Many other objects and advantages of the construction herein shown and described will be obvious to those skilled in the art from the disclosure herein made.

To this end my invention consists in the novel construction, arrangement and combination of parts herein shown and described, and more particularly pointed out in the claims.

In the drawings, wherein like reference characters indicate like or corresponding parts, Figure 1 is a side elevation of a truck equipped with my improved body;

Fig. 3 is a side elevation of the rear end of the body with the side boards removed;

Fig. 4 is an enlarged sectional view taken substantially on line 4—4 of Fig. 1, and Fig. 5 is an enlarged sectional view taken substantially on line 5—5 of Fig. 1.

Figure 1:
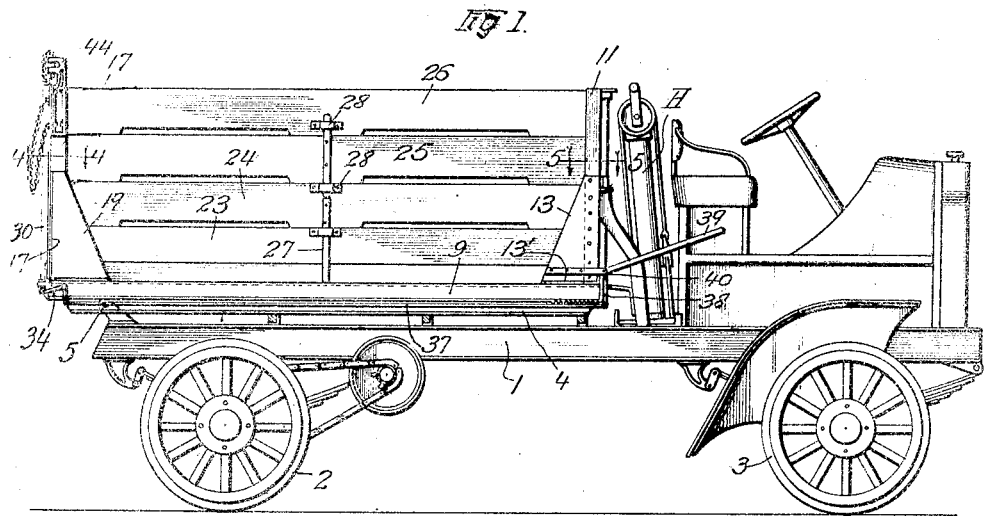
Figure 2:
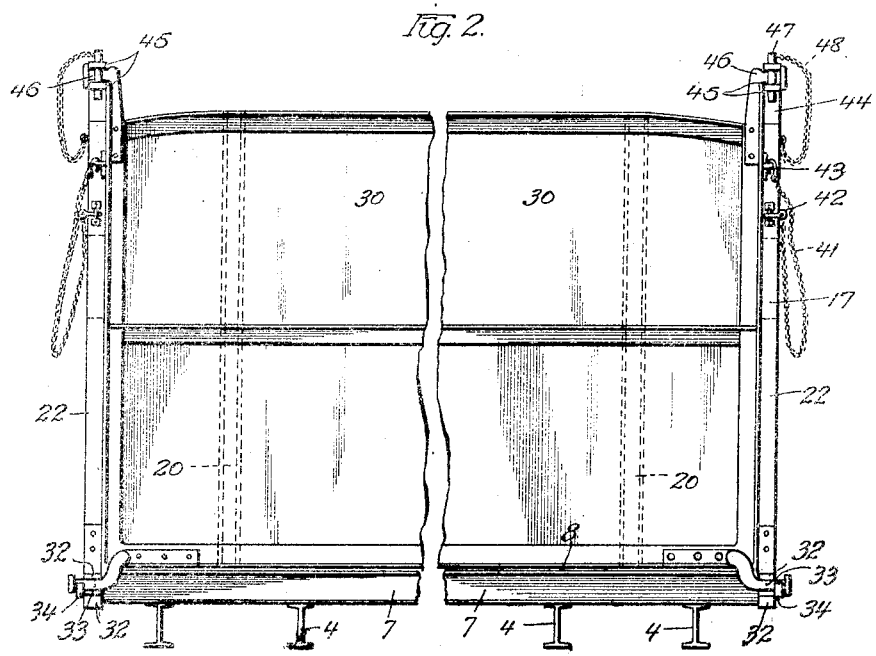
Fig. 2 is an enlarged rear elevation of the body.

Referring to the drawings, the motor truck shown consists of the chassis frame 1, provided with the usual rear and front wheels 2 and 3, and with suitable springs, motive power and steering mechanism, not necessary to describe herewith. The frame 1 may be representative or illustrative of any type of motor driven or horse drawn truck or the like, this being immaterial in so far as the use of my improved body is concerned.

The body shown in Fig. 1 has the side boards in place, while in the partial view shown in Fig. 3, the side-boards are removed. It may be mentioned that the use of the various boards depends upon the use to which the truck is to be put, that is, the load to be carried, the boards being detachable, so that they may be lifted off in case it is desired to load or discharge the load from the side of the body. The body illustrated is especially adapted for carrying brick and other building material, and is constructed in the most convenient manner for loading and unloading, the same also being arranged to dump the load at one operation by tilting the body, if so desired. While the tilting is not essential in all cases it is desirable many times on a truck of this kind.

The body is preferably constructed with a frame consisting of the bars or beams 4 extending lengthwise thereof, and with the cross-beams 7, it being understood that there may be any number of beams 4 and 7. With the tilting body shown the same is pivotally secured at 5 to the chassis frame 1, any preferred pivotal construction being employed. I have shown a hydraulic hoist H for raising the front end of the body or tilting the same when desired to discharge or dump the load in this manner.

The cross beams 7 carry a floor or body bottom 8, which is preferably extended as at 8' at each side, and when made of sheet metal, as shown, turned down as at 9, the extended part 8' forming substantially a loading and unloading platform and bumper extending the entire length of the body, as will be more fully explained hereafter. Upon each side at the front end of the body, and spaced inwardly from the extreme side edge of the body, I secure a stake, preferably of angle iron 10—11, or its equivalent, to which is secured the front wall 12, which extends across the front of the body. The front wall 12 may be braced and secured in any desired manner. As shown, one flange of the stake extends rearwardly while the other extends inwardly, the outer flange having a gusset plate 13 or its equivalent, secured thereto with its lower end flanged as at 13' and secured to the bottom structure. Secured to the angle iron at each corner at the front end, is a side board retaining member 14, which may be of suitable size and shape. For the purpose I show a channel iron 14, which is secured to the stake. At each side of the body, at the front end, and spaced inwardly from the corner stakes, I place a side board retaining member 15, which is also shown in the form of a channel bar, the same being secured to or carried by the front wall 12. The same may be braced or reinforced by a bracket 16, or the equivalent, if so desired.

At each rear corner, and particularly at the rear of the front stake, I place a rear stake 17, as shown, formed of angle iron, to which is attached the channel 18, corresponding with the channel 14 at the front end of the body. A relatively short rear wall 22 is also provided at each side. At the inner end of each rear wall is arranged a channel 20, which may be braced by the bracket 21, or equivalent means if desired. The bracket 20 is arranged directly back or at the rear of the channel 15. I have shown the angle 17 reinforced by a side plate 19 secured thereto, and it is flanged as at 19' at the bottom and secured to the body structure.

In Fig. 1, I have illustrated four side boards, 23, 24, 25 and 26, the ends of the side boards at the forward end of the body being engaged between the side of the channel 14 and at the rear between the flanges, or sides of the channel 18. They will engage with the channels 15 and 20 in the same manner when it is desired to move the side boards inwardly, so as to decrease the cubic capacity of the body. The boards may, of course, be constructed in any desired manner and of any suitable material. In the construction shown they are provided with bars or stakes 27 arranged to engage in brackets or cleats 28, this preventing their bulging at the center when the body is loaded.

At the rear end of the body I provide a suitable detachable tail-gate 30, and it may be mentioned that the tail-gate shown is arranged to be detachably pivotally hung at the bottom, as shown in the full lines in Fig. 3, or at the top, as shown in the dotted lines in the same figure. When hung at the bottom it provides additional loading space, or it may be used to close the end of the body, and when hung at the top it permits easy and convenient dumping. My preferred construction consists of a bracket 31 arranged on each side of the body at the rear, and carried by the outside stake thereat, the same having projecting parts 32 arranged to receive the pivot pins or brackets 33 on the tail-gate. Any suitable means may be provided for locking the gate to the brackets 31. A very convenient arrangement is shown, which securely locks the same in place when the gate is dropped, as shown in Fig. 3, or when closed, but which may be controlled from the driver's seat to release the bottom of the gate when the same is pivotally secured at the top, and the body tilted, as indicated in the dotted lines in Fig. 3. For the purpose I have shown a hook or latch 34, which may be pivotally secured at 35 to the body, and which has a bell-crank arm 36. The arm 36 is connected by a bar or rod 37, or its equivalent, to an arm 38, which is provided with a handle or lever 39, the same being pivotally secured at 40 to the body. One operating lever 39 may be provided for operating the two arms 38, one on each side, so that the latches or locks at the rear of the body may be controlled from one lever by the driver without leaving the seat.

I have shown a chain 41 secured to the gate at 42, and to the brackets 44, there being a chain preferably on each side. The function of the chain is to support the gate, as indicated in the full lines in Fig. 3, when desired. I form the upper end of the parts 44 with the extending parts 45 substantially corresponding with the extending parts 32 at the bottom. These are adapted to receive the pivotal pins or brackets 46 at the upper end of the gate. For the purpose of securing the upper end, I have shown pins 47, which may extend through holes in the extended parts 45, and maintain the top side of the gate in place. To prevent loss of the pins I show chains 48 for securing them to the brackets 44, the sockets 49 being formed on the brackets 44 to receive the same.

In using the truck and assuming that it is desired to load the truck, the side boards at one side of the body may be removed and the truck loaded from the side. The loader can stand on the extended bottom 8 to complete the load and to replace the side boards, the side boards ordinarily being placed as the load is put on. He can, of course, load from the rear, but the side loading is particularly convenient, and saves much walking from one end of the body to the other. Where the load is of considerable weight and of less bulk, the boards are placed in the channels 15 and 20 ordinarily, and where there is less weight and considerable bulk they may be placed in the channels 14 and 18 respectively. In the first instance there is considerable space for the loader to stand at the exterior of the boards, while in the latter not quite so much. The extended bottom beyond the stakes also tends to protect the stakes and side boards from being struck by obstructions. When it is desired to unload the side boards may be removed, and the laborer may pick up the bricks with the usual brick tongs or by hand, taking them from the side of the vehicle. Other materials may be handled in the same way. If desired, depending upon the load, the tail-gate 30 may be dropped, as indicated in the full lines in Fig. 3, and a portion of the load carried thereon. If it is desired to discharge the load by dumping, the tail-gate being secured at the top, as previously mentioned, the driver can release the tail-gate at the bottom by manipulating the lever 39, obviating getting out of his seat. He can then operate the hydraulic hoist to tilt the body, as indicated in the dotted lines in Fig. 3, and if desired, may at the same time propel the truck forward to the desired extent. Where the side boards are not employed the full width of the body to the extreme edges of the extensions 8' of the bottom may be employed to carry the load, thereby increasing the capacity of the truck to this extent. As previously mentioned, the body is applicable to motor or horse driven trucks or motor truck trailers, this being a matter that has no bearing on the present invention except in so far as the same is a carrier for my preferred body. It will be particularly noted that the corner posts being of angle iron are extremely rigid, particularly so when braced by the gusset plates mentioned.

The angle irons 15 and 21, of course, also reinforce the corner posts, as well as co-operating therewith to form the guides for the side boards. The tail-gate may, of course, be removed or detached at any time the same is not desired, it being possible to detach or attach the same in a moment's time when desired.

Having thus described my invention, it is obvious that various immaterial modifications may be made in the same without departing from the spirit of my invention; hence I do not wish to be understood as limiting myself to the exact form, construction, arrangement or combination of parts herein shown and described, or uses mentioned.

What I claim as new and desire to secure by Letters Patent is:—

1. In a vehicle body of the kind described and in combination, a suitable frame, a bottom carried by said frame, and a stake arranged at each corner of the body adjacent the edge, a second stake set inwardly relative the side edge of the body at each corner and spaced from said first-mentioned stakes, side boards arranged at each side of the body and of a length to extend between the stakes at the front and rear ends thereof, said stakes formed to engage the ends of said side boards.

2. In a vehicle body of the kind described and in combination, a suitable frame, a bottom carried by said frame, and a stake arranged at each corner of the body adjacent the edge, a second stake set inwardly relative the side edge of the body at each corner and spaced from said first mentioned stakes, side boards arranged at each side of the body and of a length to extend between the stakes at the front and rear ends thereof, said stakes formed to engage the ends of said side boards, and a tail-gate carried by similar rear stakes.

3. In a vehicle body of the kind described and in combination, a suitable frame, a bottom part carried by said frame, a pair of stakes arranged at the front end of the body adjacent the corners, a second pair of stakes arranged at the front end of the body and spaced from the outer edges and said first mentioned stakes, a pair of rear stakes carried by the body adjacent the rear corners thereof, a second pair of rear stakes arranged at the rear of the body and inwardly spaced from the side edges of the bottom and said rear stakes, a front wall extending across the front of the body and connecting said stakes thereat, a rear wall at each side of the body at the rear connecting the adjacent stakes on each side, and side boards of a length to extend between the front and rear stakes on each side of the body.

4. In a vehicle body of the kind described and in combination, a suitable body frame, a bottom carried by said frame, stakes arranged at the front and rear ends of said body, said body bottom projecting beyond the stakes at each side of the body, the stakes at the front end of the body formed of channel iron with the two flanges thereof projecting rearwardly, an angle iron secured to said stakes with the flanges projecting rearwardly, a brace plate secured to said angle iron and extending rearwardly to the bottom and secured thereat, a pair of stakes arranged at the rear of said body, one on each side thereof, with the bottom projecting beyond the same at its side edges, said rear stakes each consisting of a channel iron extending upwardly with the flanges extending toward the front end of the body, an angle iron arranged on the side of the channel and secured thereto with its other flange extending parallel with the base of the channel, side boards arranged at each side of the body, said side boards of a length to extend between said stakes and be engaged at their ends between the flanges of the channel irons.

5. A vehicle body having a bottom and suitable sides, means carried by the bottom and located in different inward positions from the edges thereof for receiving and detachably retaining the vehicle sides in position, said sides being received and held in position by either of said retaining means to vary the capacity of the body.

6. In a vehicle body having a bottom and sides, means for detachably retaining the sides in position comprising a pair of separated retaining members spaced inwardly from the bottom, either of said retaining members being adapted to receive and retain a side of the body to vary the capacity thereof.

7. In a vehicle body having a bottom and sides therefor, and means for supporting one of said sides different distances from the other, said means comprising inwardly spaced channels carried by the bottom, any one of said channels being adapted to receive and support the side.

8. A vehicle body having a suitable bottom, and side walls therefor, separated means spaced inwardly from the outer edge of one side of the body for detachably receiving and retaining one of the sides in position, other of said retaining means being adapted to receive and support the side to vary the capacity of the body, and means for supporting the other side of the body in position.

9. A vehicle body having a bottom and side walls therefor, means for supporting one side wall, and means spaced inwardly from the outer edge of the bottom at the opposite side thereof for supporting the other side wall in different positions relative to the first mentioned side wall to vary the capacity of the body.

10. A vehicle body having a bottom and suitable side walls therefor, means for holding one side wall in position, and means carried by the bottom and located in different inward positions from the edge thereof for receiving and detachably retaining one side in different positions to vary the capacity of the body.

In testimony whereof I have hereunto signed my name in the presence of two subscribing witnesses.

JACOB H. PRESS.

Witnesses:
 Roy W. Hill,
 Charles I. Cobb.